United States Patent [19]

Handa et al.

[11] Patent Number: 4,766,356
[45] Date of Patent: Aug. 23, 1988

[54] DEVICE FOR OPENING AND CLOSING A VEHICLE TOP

[75] Inventors: Noboru Handa; Takahiko Tanaka, both of Shizuoka, Japan

[73] Assignees: Asmo Co., Ltd., Kosai; Mazda Co., Ltd., Hiroshima, both of Japan

[21] Appl. No.: 937,238

[22] Filed: Dec. 3, 1986

[30] Foreign Application Priority Data

Dec. 3, 1985 [JP] Japan ............................... 60-272138
Jun. 23, 1986 [JP] Japan ............................... 61-146710

[51] Int. Cl.$^4$ ........................... B60J 7/08; H02P 5/50
[52] U.S. Cl. ...................................... 318/55; 318/54; 318/77; 296/117
[58] Field of Search .................... 318/54, 68, 69, 70, 318/77, 282, 55; 49/30; 280/30; 180/89.1; 296/117, 223

[56] References Cited

U.S. PATENT DOCUMENTS

| | | | |
|---|---|---|---|
| 2,692,162 | 10/1954 | Rossmann | 296/117 |
| 2,753,508 | 7/1956 | Inman | 180/89.1 X |
| 3,116,087 | 12/1963 | Baumann | 296/117 |
| 4,093,851 | 6/1978 | Paulinski | 371/28 |
| 4,644,235 | 2/1987 | Ohta | 318/282 |

FOREIGN PATENT DOCUMENTS

1522822 8/1978 United Kingdom .
2120427 11/1983 United Kingdom .

Primary Examiner—Bentsu Ro
Attorney, Agent, or Firm—Burns, Doane, Swecker & Mathis

[57] ABSTRACT

A device for opening and closing a vehicle top by rotations of drive shafts rotatably provided with both right and left sides of the vehicle, comprises two individual motors which actuate the individual drive shafts through speed reduction mechanisms, switching relays which switch the direction of rotation of both said motors respectively, switching relay actuation transistors which individually actuate both the switching relays, top-open and top-close command switches which command the opening and closing of said vehicle top, a switch command determination means which ascertains whether the top-open or top-close command switches are operated, an actuation means which conducts the top opening or closing by actuation of said switching relays via said switching relay actuation transistors on the basis of a signal from the switch command determination means when the top-open or top-close command switches are operated, rotation synchronization sensors which are possessed by at least one of the two motors and generate a pulse synchronized to the rotation of the motor, and a rotation synchronization correction means which synchronizes the rotation speed of both the motors when the pulses are fedback via the rotation synchronization sensor as the rotation speed of one of the two motors drops.

5 Claims, 5 Drawing Sheets

| FIG. 3A |
|---|
| FIG. 3B |

DEVICE FOR OPENING AND CLOSING A VEHICLE TOP

BACKGROUND OF THE INVENTION

The present invention relates to a device for opening and closing a vehicle top.

DESCRIPTION OF THE PRIOR ART

Well known existing devices for opening and closing vehicle tops include both manual and hydraulic devices. However, manual devices are difficult to operate and are particularly unsuitable for females. Hydraulic devices require oil pumps and working cylinders, resulting in large scale convertible top systems.

SUMMARY OF THE INVENTION

An object of the present invention is to provide a device for opening and closing a vehicle top which is easily operable.

Another object of the present invention is to provide a device for opening and closing a vehicle top which has a small scale driving mechanism.

A further object of the invention is to provide a device for opening and closing a vehicle top where the vehicle top can be opened and closed parallel with the vehicle.

A further object of the invention is to provide a device for opening and closing a vehicle top which is safely operable and accidental operation does not occur even if a part of a driver or an article touches a top open command switch in error.

It is a further object of the invention to provide a device for opening and closing a vehicle top where the vehicle top is not opened when the vehicle is traveling, but safe traveling of the vehicle is attained.

It is a further object of the invention to provide a device for opening and closing a vehicle top where a phase difference between a left side and a right side of the vehicle top is automatically compensated, even if such phase difference occurs by repairs of the vehicle top.

Another further object of the invention is to provide a device for opening and closing a vehicle top where a motor for actuating the device is automatically stopped when the device is locked for certain reasons.

Other and further objects, features and advantages of the invention will appear more fully from the following description.

DETAILED DESCRIPTION OF PREFERRED EMBODIMENT

Following is a description of an embodiment of the present invention in accordance with the drawings.

Figures 1, 1A:
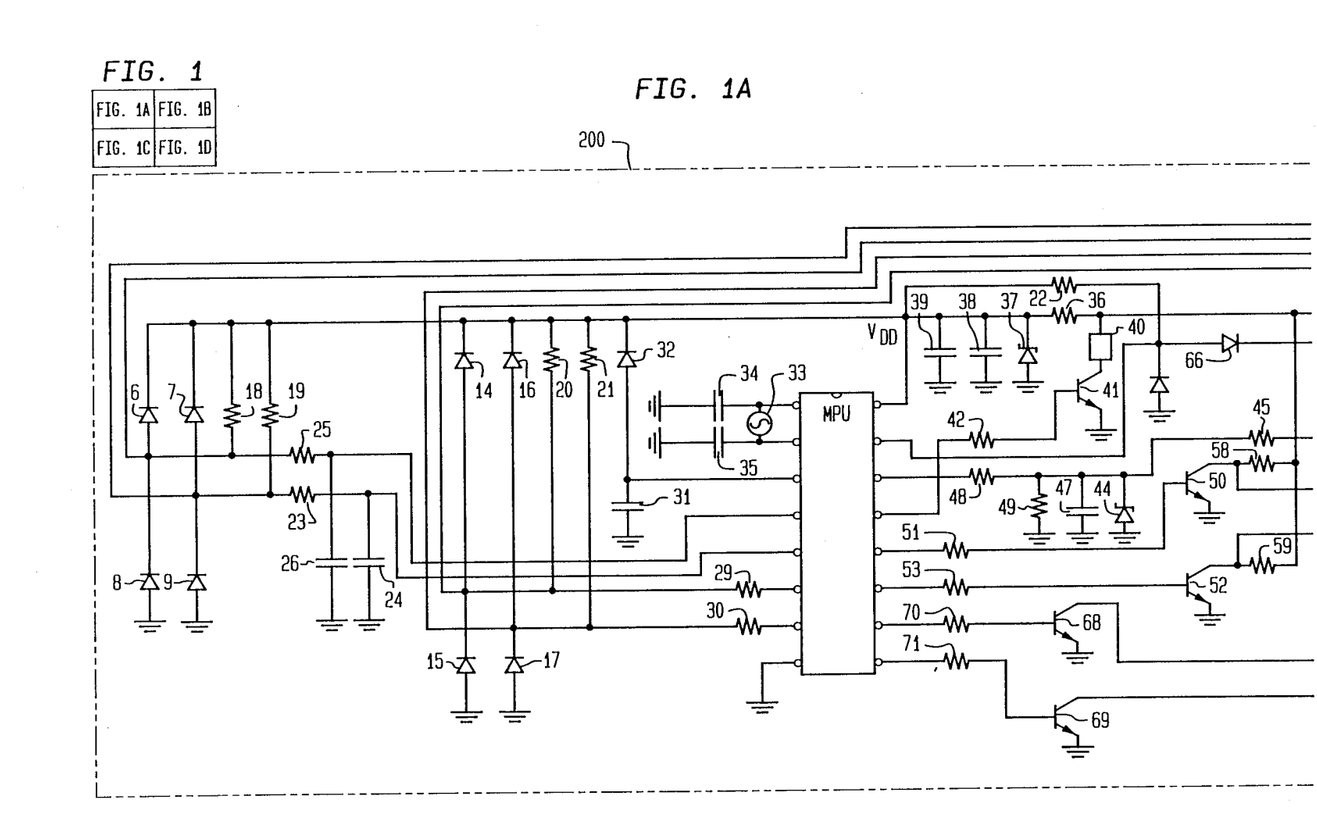
FIG. 1 is a circuit diagram describing an embodiment of the present invention.
Figure 1B:
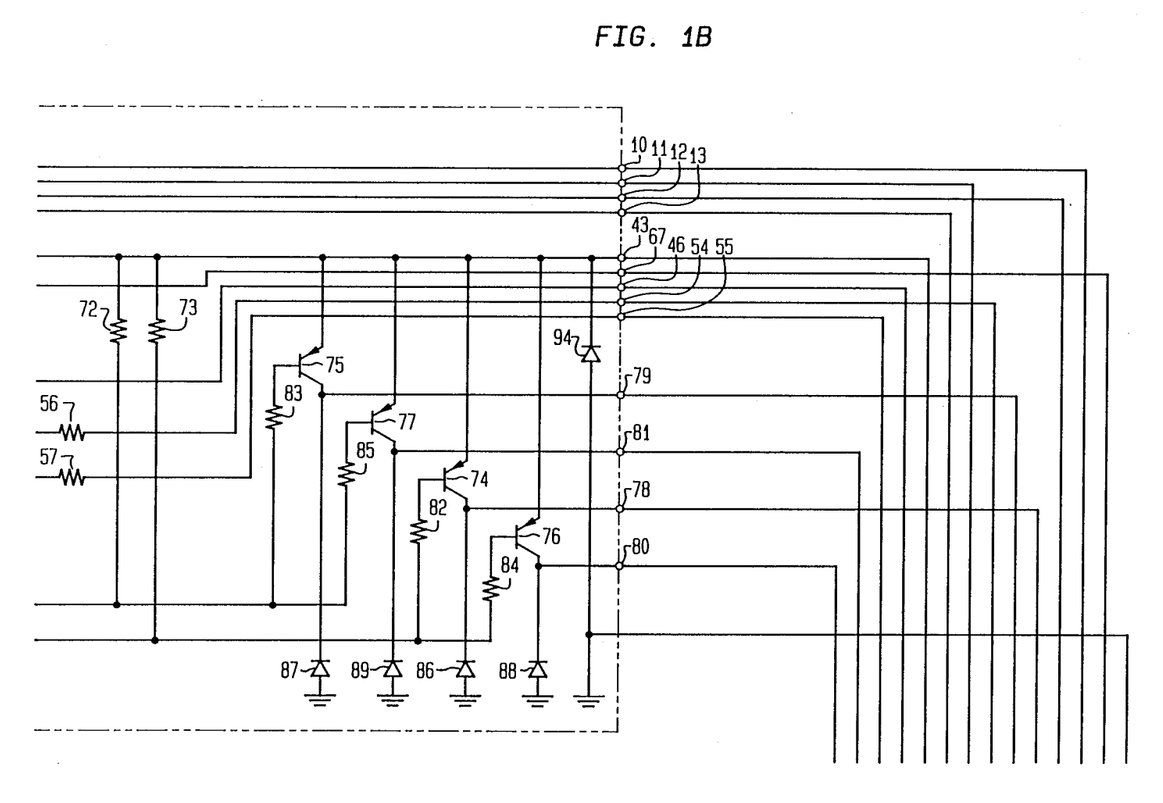
Figure 1C:
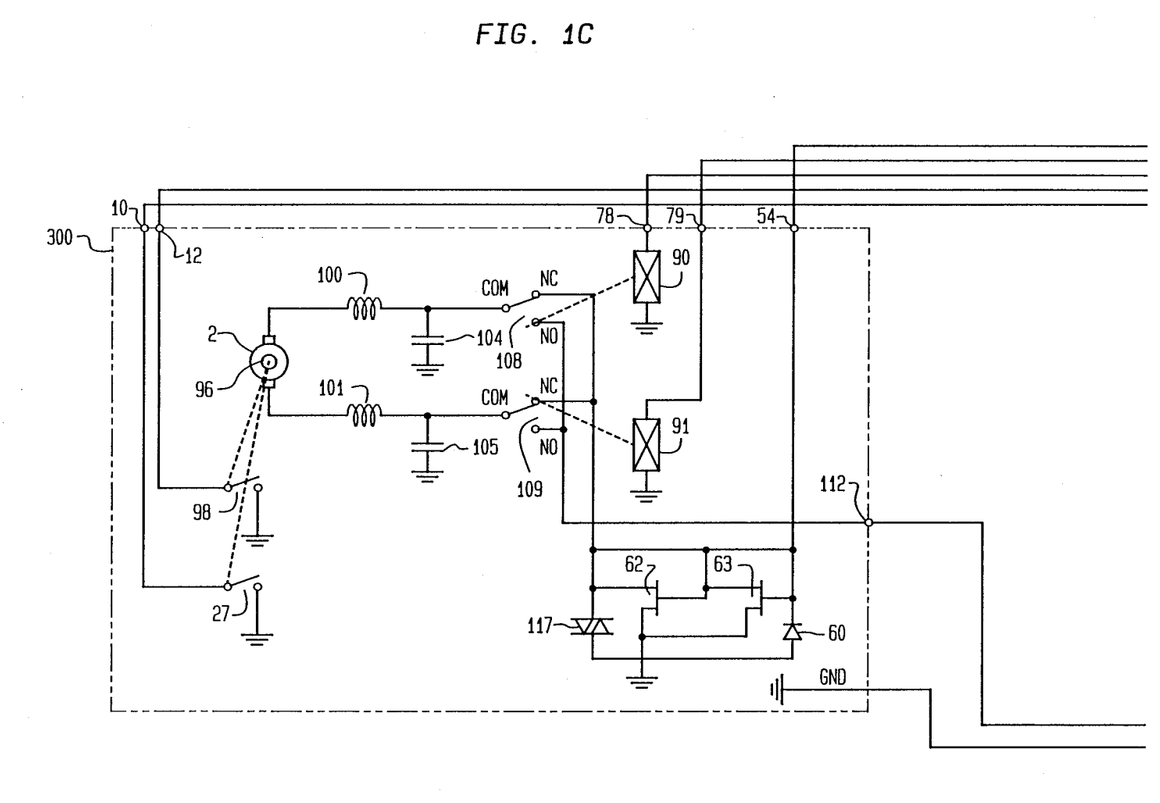
Figure 1D:
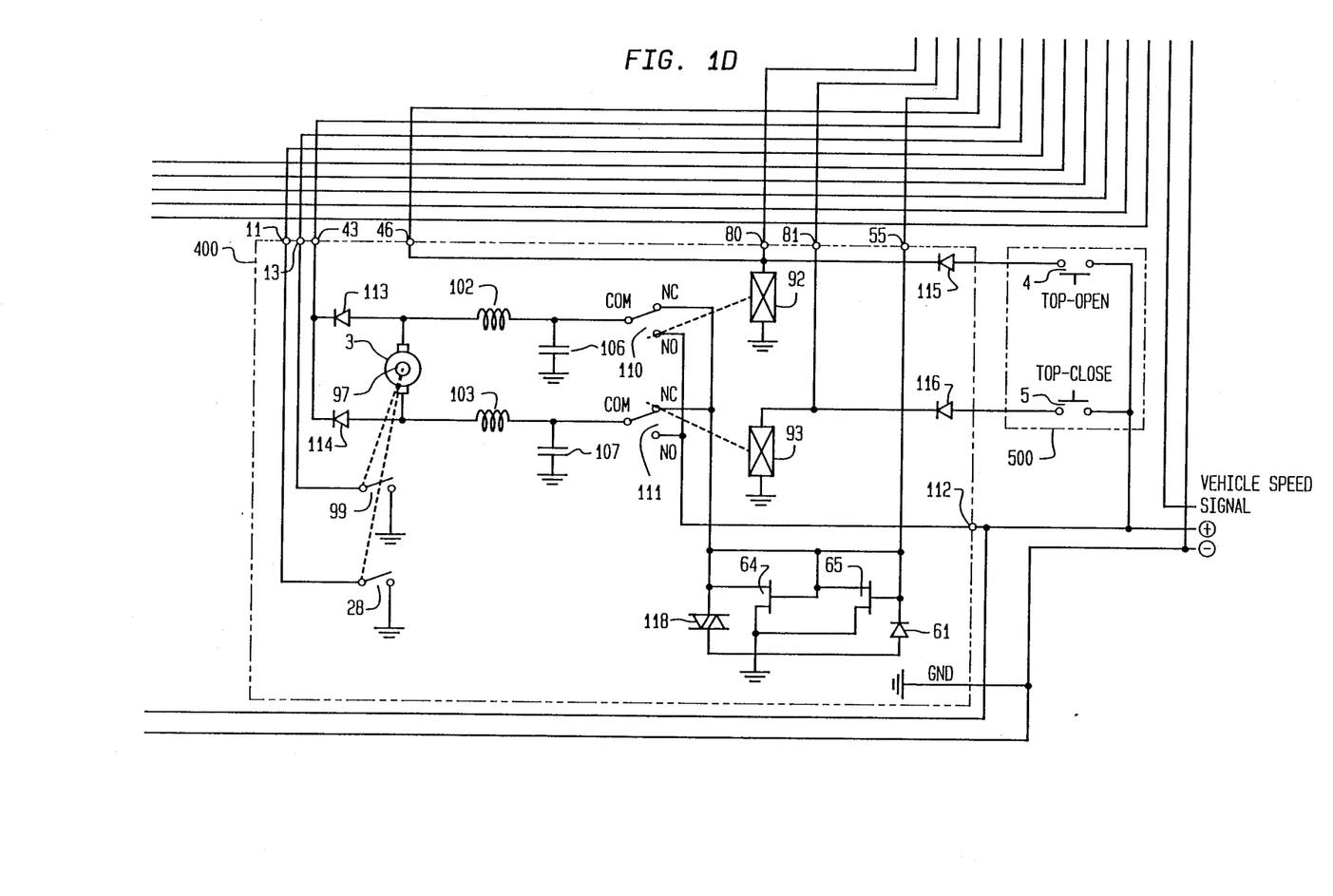

As illustrated in FIG. 1, an embodiment being the present device for opening and closing a vehicle top comprises actuation circuit 200 with the principal element of microcomputer 1, primary motor actuation circuit 300 with primary motor 2, secondary motor actuation circuit 400 with secondary motor 3, and command switch 500 with top-open command switch 4 and top-close command switch 5. Said switches 4 and 5 are push button switches which are closed only during operation.

In actuation circuit 200, diodes 6, 7, 8 and 9 are input protection diodes of the control microcomputer 1 (hereinafter referred to as MPU 1). During positive direction surge impression to input terminals 10 and 11 of actuation circuit 200, MPU 1 input ports SW 4 and SW 6 are shorted by means of diodes 6 and 7, and during negative direction surge impression, MPU 1 is protected by means of the shorting of diodes 8 and 9. Other input protection diodes are diodes 14, 15, 16 and 17. Negative direction surges toward input terminals 12 and 13 of actuation circuit 200 are shorted by means of diodes 15 and 17, while positive direction surges from terminals 12 and 13 are shorted by diodes 14 and 16, thus protecting input ports SW 3 and SW 5 of MPU 1. Resistors 18, 19, 20, 21 and 22 are pull-up resistors. Resistor 23 and condenser 24, resistor 25 and condenser 26 are integrating circuits for eliminating noise produced via chattering from rotation synchronization sensors 27 and 28. Resistors 29 and 30 are protection resistors for input ports SW 5 and SW 3 of MPU 1. Condenser 31, which is connected to reset port RST of MPU 1, is used for power-on reset. The charging resistance is determined within MPU 1. Diode 32 is used for discharging condenser 31. Oscillator 33 is a ceramic oscillator which generates a clock signal to actuate MPU 1. Condensers 34 and 35 stabilize the oscillation of ceramic oscillator 33. Resistor 36, which is connected to MPU 1 power source input port VDD, and zener diode 37 form a constant-voltage circuit which supplies voltage (5 V) to actuate MPU 1 from the normal 12 V vehicle power source voltage of power source terminal 43. Condenser 38 is a stabilizing condenser and condenser 39 is a ceramic condenser which are used as high frequency noise cutting condensers. Ceramic buzzer 40, which is connected to power source terminal 43, is used to inform the vehicle operator about the actuation state of the vehicle top switching device. The collector of actuation transistor 41 is connected in series to ceramic buzzer 40, and the base of said transistor is connected to the buzzer output port BZ of MPU 1 by means of resistor 42, which is used as a base current limiter. Zener diode 44, which is connected to input terminal 46 of actuation circuit 200, and resistor 45 form a feedback circuit for determining when vehicle top-open command switch 4 of vehicle top command switch circuit 500 is in the closed position. When vehicle top-open command switch 4 is in the closed position, it forms a constant-voltage circuit stabilizing voltage identical with the MPU 1 actuation power source due to the power source positive polarity (+) voltage impression. Condenser 47 is connected in parallel to zener diode 44 and together they form a noise prevention integrating circuit. Resistor 48 is an input protector connected between input port O/C of MPU 1 and the non-grounded terminal of zener diode 44. Pull-down resistor 49 is connected to port O/C in parallel relationship to zener diode 44 in order to provide normal low-voltage (hereinafter referred to as L). Transistor 50, which is connected to MPU 1 output port FET 1 via base resistor 51, and transistor 52, which is connected to output port FET 3 via base resistor 53, are both level conversion transistors which convert the ON/OFF voltage for MPU 1 output ports FET 1 and FET 3 to vehicle power source voltage ON/OFF. Collector outputs for said transistors 50 and 52 are connected to, respectively, actuation circuit 200 output terminals 54 and 55 by means of resistors 56 and 57. The collectors of transistors 50 and 52 are connected to, respectively, power source terminal 43 by means of collector resistors 58 and 59. Without the aforesaid resistors 56, 57 and zener diodes 60 and 61, which are built into motor actuation circuits 300 and 400, the vehicle top switching device of the present embodiment would be operable, however, since the gate current flow is negligible, there is a tendency for faulty contact in the vehicle built-in load wire terminals 54 and 55, whereupon faulty connector contact is prevented in terminals 54 and 55 when transistors 50 and 51 are OFF and a current of several milliamperes (mA) flows to terminals 54 and 55 via the aforesaid resistors 56, 57 and zener diodes 60, 61.

Diode 66, which is connected between speed signal terminal 67 of actuation circuit 200 and MPU 1 speed signal input port SP, prevents 12 V voltage impression on MPU 1 input port SP in order to allow normal vehicle power source (12 V) ON/OFF signal to be impressed as a vehicle speed signal. Transistors 68 and 69, which are connected to MPU 1 output ports R 24 and R 13 via base resistors 70 and 71, are level conversion transistors that convert the ON/OFF signals in said resistors R 24 and R 13 to 12 V vehicle power source voltage ON/OFF signals. The collectors of said transistors 68 and 69 are connected to power source terminal 43 via collector resistors 72 and 73. The emitter of relay actuation transistors 74, 75, 76 and 77 are all connected to power source terminal 43, while the collectors of said transistors are connected to output terminals 78, 79, 80 and 81, respectively. The bases of said transistors 74 and 76 are connected to the collector of a level conversion transistor 69 via base resistors 82 and 84. The bases of transistors 75 and 77 are connected to the collector of a level conversion transistor 68 via base resistors 83 and 85. Diodes 86, 87, 88 and 89, which are inserted between the grounds and the collectors of relay actuation transistors 74, 75, 76 and 77, absorb reverse voltage generated from the switching relay coils 90, 91, 92 and 93 of motor actuation circuits 300 and 400. Diode 94, which is inserted between the ground and power source terminal 43, absorbs reverse voltage in the power line in the same way.

Motors 2 and 3 of motor actuation circuits 300 and 400 are direct current ferrite motors, wherein rotation synchronization sensors 27 and 28 are affixed to the armature, said sensors being reed switches that turn ON/OFF once with each single revolution of the armature. Motors 2 and 3 have speed reduction mechanisms comprised of multiple gear trains, and have position feedback switches 98 and 99 on actuation shafts 96 and 97 of vehicle top 120, which are the final output shafts. High frequency coils 100, 101, 102 and 103, which are connected in series to motors 2 and 3, and condensers 104, 105, 106 and 107, which are inserted between the power source of said coils and the grounds, prevent spark noise generated by the brushes of motors 2 and 3 from entering the radio and other equipment. Field effect transistors 62, 63, 64 and 65 are switching motor interrupters for speed regulation of motors 2 and 3. Source and drain of said field effect transistors 62, 63, 64 and 65 are inserted between the normally closed terminals NC of switching relay contacts 108, 109, 110, 111 and the grounds. The gates are connected to terminals 54 and 55, respectively. The common terminal COM of switching relay contacts 108, 109 and switching relay contacts 110, 111 are connected to motors 2 and 3 by means of high frequency coils 100, 101, 102 and 103, and the normally open terminals NO of said relay contacts 108, 109, 110 and 111 are connected to power terminal 112.

In motor actuation circuit 400, diodes 113, 114, which are connected to power source terminal 43 and the top and bottom of motor 3, prevent short circuiting of the armature of motor 3, and supply power to actuation circuit 200 by means of motor 3 brushes. When vehicle top-open command switch 4 with diode 115 connected to switching relay coil 92, and vehicle top-close command switch 5 with diode 116 connected to switching relay coil 93 are closed, and field effect transistors 64 and 65 are OFF, voltage generated by motor 3 is impressed to power source terminal 43. Thereupon, current is prevented from flowing into the vehicle power source through transistors 75, 77 or the emitters and collectors of transistors 74, 76, thus preventing the destruction of said transistors 75, 77, 76 and 74. The source and drain of field effect transistors 62, 63 and 64, 65 are connected in parallel to varistors 117 and 118, respectively, so that reverse voltage generated from motors 2 and 3 will be absorbed during switching of field effect transistors 62, 63 and 64, 65.

Figure 2:
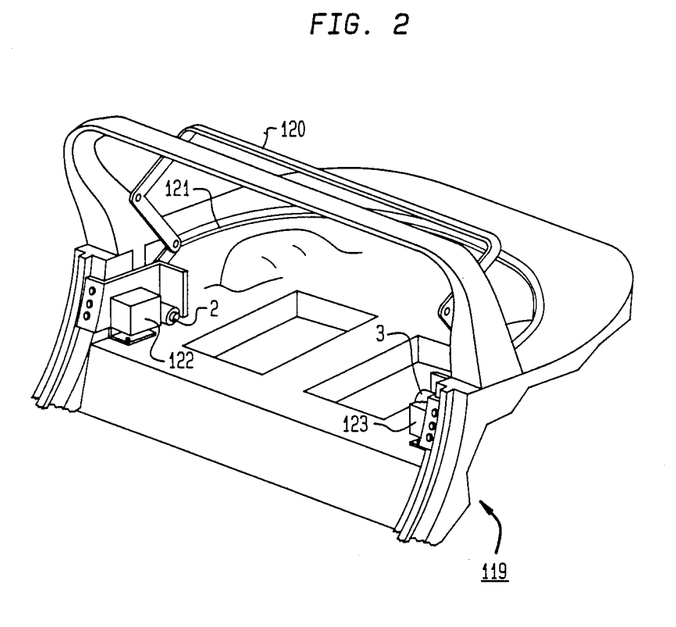
FIG. 2 is a partly fragmentary perspective illustration of a vehicle which has removed a vehicle top and a hard roof.

As described in FIG. 2, vehicle top (not shown) 120 is adjacent and connected between vehicle top stretching links 120 and 121 on the upper section of vehicle 119, said vehicle top can be opened and closed by means of drive shafts of motors 2 and 3 providing gear boxes 122, 123 and attached to both right and left sides of said vehicle 119. The aforementioned position feedback switches 98 and 99 are ON during opening and closing of vehicle top, and are OFF when within 10° of full open or full closed positions. (Actuation)

Figure 3:
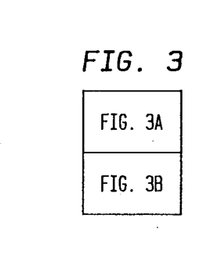
FIG. 3 is a flow chart of the MPU program.
Figure 3A:
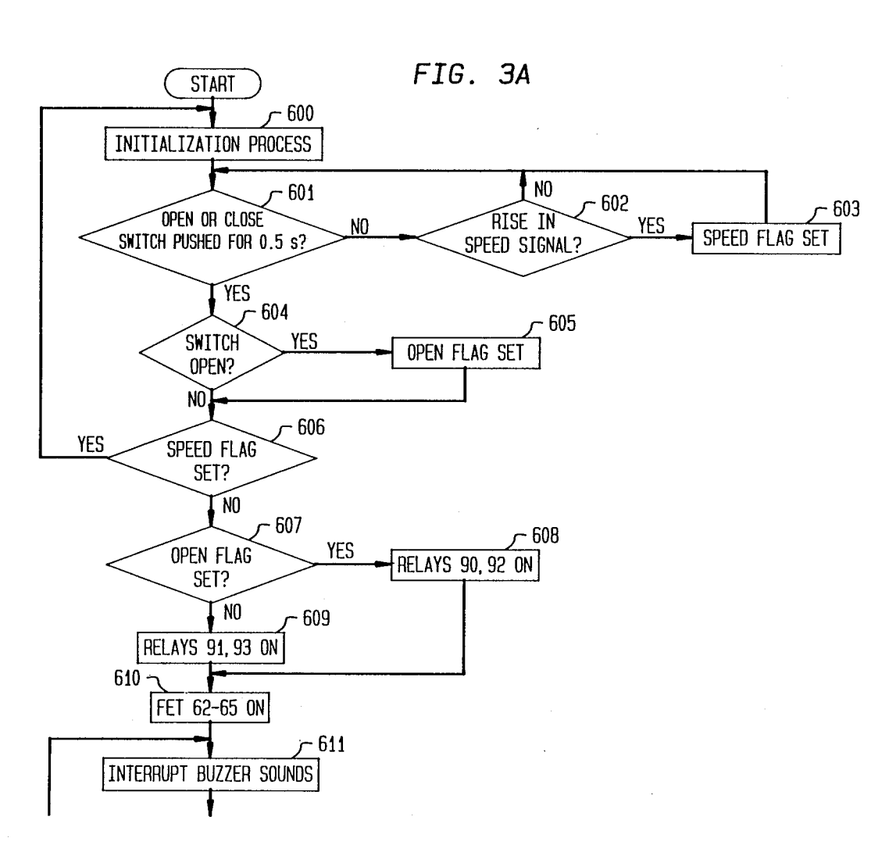
Figure 3B:
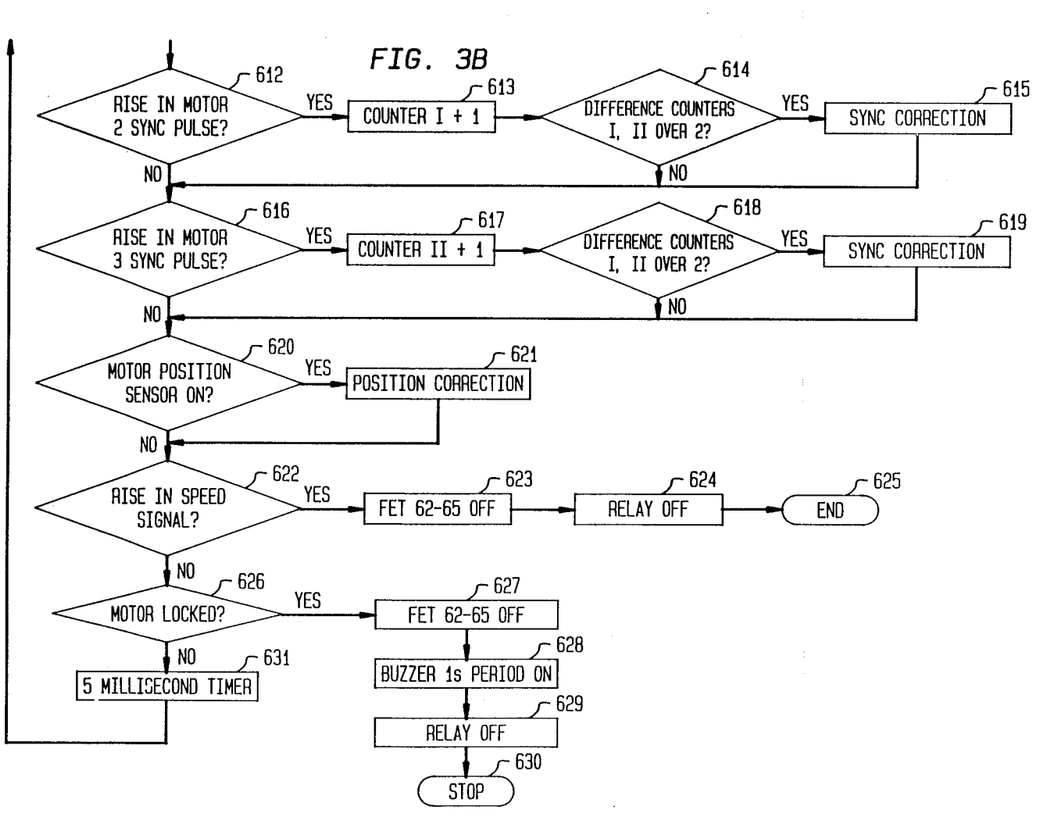

Actuation shall be explained herein in accordance with FIG. 3, which describes the MPU 1 program, and the aforementioned FIG. 1 and FIG. 2.

FIG. 1 describes the circuits in a non-actuated state. Vehicle top-open command switch 4 and top-close command switch 5 are both open, and voltage from power terminal 112 is impressed only to normally open contacts NO of switching relay contacts 108, 109, 110 and 111. Thus, there are no malfunctions of motors 2 or 3 from noise or other interference because vehicle power source positive polarity voltage is not supplied to motors 2, 3 or power source terminal 43 of actuation circuit 200. Explanation now follows for the actuation process when top-open command switch 4 is pushed to open top 120 when top 120 of vehicle 119 is in the completely closed state. When top-open command switch 4 is closed, current flows from the positive power source through said switch 4, diode 115 and relay coil 92 to the ground, switching relay contact 110 is switched on and said coil makes contact with normally open contact COM. When switching relay contact 110 is ON, power originating from the positive power source is supplied from power terminal 112, the normally open contact NO of switching relay contact 110, common terminal COM, high frequency coil 102 and diode 113 to power source terminal 43, thus actuating actuation circuit 200. When power is supplied to power source terminal 43, condenser 31 is charged from the grounded side and MPU 1 is reset by the slow voltage impression to the RST port than the VDD port. During reset, MPU 1 output ports R 13, R 24, FET 3, FET 1 and BZ are all at low electric potential (hereinafter low voltage is referred to as "L" and high voltage is referred to as "H"), transistors 41, 50, 52 and transistors 68, 69 are all in OFF state, and through the OFF state of transistors 68 and 69, transistors 74, 75, 76 and 77 also reach the OFF state. In step 600, each flag and counter of MPU 1 undergoes initialization. Whereupon, in the loops of steps 601 and 602, a check is made for a rise from "L" to "H" in the vehicle speed signal. After the vehicle top-open command switch 4 (or top-close command switch 5) is pressed for more than 0.5 s, the process continues to step 604. The aforesaid loop prevents unstable running of vehicle 119 due to top operation device malfunction when switches 4 and 5 are inadvertently touched or when buffeting wind is encountered by opening (or closing) of said top 120 while vehicle 119 is moving. In step 604, it is decided whether or not top-open command switch 4 or top-close command switch 5 has been pushed. In the present embodiment when top-open command switch 4 is closed, voltage from said switch 4 is applied to MPU 1 input port O/C by means of diode 115 and terminal 46, said port O/C thus registers "H." When top-close command switch 5 is closed and top-open command switch 4 is open, the aforesaid port O/C registers "L" via pull-down resistor 49. When said input port O/C registers "H," the open flag is set in step 605. In step 606, a check is made to determine whether or not the vehicle speed flag is set. If the results are positive, the process returns to step 600 and the following operations do not occur, that is, while vehicle 119 is moving, top 120 cannot open or close. If the results of determinations in step 606 are negative, a check is made in step 607 to see whether or not the open flag is set. Since positive results are derived in the present example, in step 608, MPU 1 output port R 13 registers "H," level conversion transistor 69 registers ON, switching relay actuation transistors 74 and 76 are ON, and, by means of current from output terminals 78 and 80, switching relay coils 90, 92 register ON, and switching relay contacts 108, 110 common terminal COM is connected to normally open terminal NO. Thereupon, relay actuation transistors 74, 76 of actuation circuit 200 maintain the ON state due to voltage supplied from the vehicle power source positive polarity to power source terminal 43 from the normally open terminal NO of switching relay contact 110 through common terminal COM, high frequency coil 102 and diode 113. Switching relay coils 90, 92 are holding. Thus, voltage continues to be supplied to power source terminal 43 of actuation circuit 200 even when the vehicle operator's hand releases top-open command switch 4 after 0.5 s.

In contrast to the above example, when top-close command switch 5 is closed, switching relay coils 91 and 93 are actuated simultaneously, initiating holding. Because the current flowing to motors 2 and 3 is reversed via the connection of normally open terminal NO to the common terminal COM of switching relay contacts 109 and 111, the rotational direction of said motors 2 and 3 are also reversed when top-open command switch 4 is closed.

In step 610, MPU 1 output ports FET 1 and FET 3 register "H," and field effect transistors 62-65 register ON due to registered ON states of level conversion transistors 50 and 52, whereby voltage is received, respectively, by the bases of field effect transistors 62, 63 and 64, 65 from output terminals 54 and 55 of actuation circuit 200. Thus, by the grounding of motors 2 and 3 through common terminal COM of switching relay contacts 109 and 111, normally closed terminal NC and the source and drain of field effect transistors 62, 63 and 64, 65, motor 2 and motor 3 commence rotation in the normal direction, drive shafts 96 and 97 rotate via the speed reduction mechanism, and top 120 begins to open.

Step 611 is a process in which buzzer 40 activates intermittently at 0.5 s intervals, informing the operator that vehicle top opening (or closing) is in progress. When MPU 1 output port BZ registers "H," actuation transistor 41 registers ON and ceramic buzzer 40 sounds. When output port BZ registers "L," actuation transistor 41 registers OFF and buzzer 40 ceases sound emissions.

In step 612, when rotation of motor 2 is faster than motor 3, a determination is made as to whether or not the electric potential from terminal 10 of rotation sensor 27 has risen from "L" to "H" via signals to input ports SW 4, SW 6. If the electric potential rises, counter I mounted internally in MPU 1 adds a value of one (+1). When the difference in the values of internal counter I, which counts the pulses from input port SW 4, and internal counter II, which counts pulses from input port SW 6, is 2 or more and the value of counter I is larger, "H" is registered by MPU 1 output port FET 1. Level conversion transistor 50 registers ON and field effect transistors 62, 63 register OFF because electric potential becomes "L" for output terminal 54, and the number of rotations decreases due to motor 2 load changes resulting from interruption of current to motor 2. Since output port FET 3 of MPU 1 registers "L," level conversion transistor 52 continues in the OFF state, and because output terminal 55 registers "H," field effect transistors 64 and 65 maintain the ON state, and motor 2 and motor 3 rotations are synchronized. In step 616, it is determined in the same way whether or not there is a rise in motor 3 synchronization pulse. When the results of said determination are positive, the same processes are conducted in steps 617, 618 and 619 and synchronization corrections are completed. In step 619 processing, in contrast to the aforesaid example, motor 3 rotations are synchronized with motor 2 rotations because MPU 1 output port FET 3 registers "H" and output port FET 1 registers "L." In steps 614 and 618, when the difference in values for internal counters I and II is determined to be less than two (2), motors 2 and 3 rotate again. In the present embodiment, synchronization corrections are conducted when the difference in values for counters I and II are greater than two (2) so as to prevent continual ON/OFF switching of both motors 2 and 3.

In step 620, a check is made to determine whether or not the electric potential of terminals 12 and 13 has changed from "H" to "L" by means of the ON status of either of the position feedback switches 98, 99. Since both sides of vehicle top 120 open 10° when the results of step 620 determinations are positive, in step 621, motors 2, 3 internal position feedback switches 98 and 99 register ON, motors 2 and 3 field effect transistors 62 and 63 or field effect transistors 64 and 65 register OFF, and said field effect transistors 62, 63 or 64, 65 remain OFF until other position feedback switches 99 and 98 of motors 3 and 1 change from OFF status to ON status, and position correction is conducted on drive shafts 96 and 97 from motors 2 and 3.

In step 622, it is determined whether or not a rise in vehicle speed signal has occurred. When the result of said determination is positive, then, as vehicle 119 commences travelling in step 623 (via top 120 opening to the target position), field effect transistors 62-65 register OFF status, and in step 624, switching relay coils 90 and 92 register OFF entering holding status, and top 120 open actuation is halted.

Step 626 is a process wherein it is determined whether or not motors 2 and 3 are locked by means of the pulse spacing of rotation synchronization sensors 27 and 28. Even when motors 2 and 3 are locked during process of opening actuation of vehicle top 120, or stopped when top 120 is completely open and the results of step 626 are positive in the same way, in step 627 field effect transistors 62–65 register OFF, and after buzzer 40 completes a 1 s actuation period (ON state) informs the vehicle operator in step 628. Then in step 629, switching relay coils 90 and 92 register and maintain OFF status, whereupon, top 120 opening actuation halts. When the results of determination in step 626 is negative, then in step 631, the process returns to step 611 before a 5 ms (millisecond) interval elapses.

The above description of actuation mentions an instance wherein top 120 opens from the completely closed position, however, when top 120 is closed from the completely open position, the same actuation process occurs by means of pushing top-close command switch 5.

(Other Embodiments)

In the aforesaid embodiment, while both motors 2 and 3 are connected to rotation synchronization sensors 27 and 28, respectively, the speed of the faster motor is equalized to the speed of the slower motor. If the rotation speeds of both motors are limited to a 20–30% difference via regulation of motor windings or other means, the slower motor's rotation synchronization sensor, field effect transistors, and the accompanying input/output circuits can be eliminated.

The present invention is a vehicle top-switching device which, because it comprises a means of determining operation time by means of motors for opening and closing said top, switching relays, switching relay actuation transistors, top-open command switch, top-close command switch, a microcomputer, an open/close command determination means, a means for determining vehicle movement status, a holding means, and an actuation means, said device does not require as much manual operating power or handling force for top opening or closing as prior art manual devices, possesses a function for preventing malfunctions due to command switch operation time, and a function for preventing top opening or closing while vehicle is in motion, and possesses various other superior functions in a compact size device.

Although the invention has been described in its preferred form with a certain degree of particularity, it is understood that the present disclosure of the preferred form has been changed in the details of construction and the combination and arrangement of parts may be resorted to without departing from the spirit and the scope of the invention as hereinafter claimed.

What is claimed is:

1. A device for opening and closing a vehicle top by rotations of drive shafts rotatably provided with both right and left sides of the vehicle, comprising two individual motors which actuate said individual drive shafts through speed reduction mechanisms, switching relays which switch the direction of rotation of both of said motors respectively, switching relay actuation transistors which individually actuate both of said switching relays, top-open and top-close command switches which command the opening and closing of said vehicle top, a switch command determination means which ascertains whether said top-open and top-close command switches are operated, an actuation means which conducts the top opening and closing by actuation of said switching relays via said switching relay actuation transistors on the basis of a signal from said switch command determination means when said top-open and top-close command switches are operated, rotation synchronization sensors which are possessed by at least one of the aforesaid two motors and generate a pulse synchronized to the rotation of said motor, and a rotation synchronization correction means which synchronizes the rotation speed of both of said motors when the pulses are fed back via said rotation synchronization sensors as the rotation speed of one of said two motors drops.

2. A device for opening and closing a vehicle top by rotations of drive shafts rotatably provided with both right and left sides of the vehicle, comprising two individual motors which actuate said individual drive shafts through speed reduction mechanisms, switching relays which switch the direction of rotation of both of said motors respectively, switching relay actuation transistors which individually actuate both of said switching relays, top-open and top-close command switches which command the opening and closing of said vehicle top, an operation time determination means which determines whether said top-open and top-close command switches are operated for a specified time, a switching command determination means which ascertains whether said top-open and top-close command switches are operated, an actuation means which conducts the top opening and closing when said top-open and top-close command switches are operated for the specified time, rotation synchronization sensors which are possessed by at least one of the aforesaid two motors and generate pulses synchronized to the rotation of said motor, and a rotation synchronization correction means which synchronizes the rotation speed of both of said motors when the pulses are fed back via said rotation synchronization sensors as the rotation speed of one of said two motors drops.

3. A device for opening and closing a vehicle top by rotations of drive shafts rotatably provided with both right and left sides of the vehicle, comprising two individual motors which actuate said individual drive shafts through speed reduction mechanisms, switching relays which switch the direction of rotation of both of said motors respectively, switching relay actuation transistors which individually actuate both of said switching relays, top-open and top-close command switches which command the opening and closing of said vehicle top, a switching command determination means which ascertains whether said top-open and top-close command switches are operated, a vehicle movement determination means which ascertains a rise in a vehicle speed signal, a holding means which holds actuation of said switching relays and holds power source circuits closed, an actuation means which conducts the top opening and closing by actuation of the holding means when the top-open and top-close command switches are operated for a specified time with no accompanying rise in the vehicle speed signal, rotation synchronization sensors which are possessed by at least one of the aforesaid two motors and generate pulses synchronized to the rotation of said motor, and a rotation synchronization correction means which synchronizes the rotation speed of both of said motors when the pulses are fed back via said rotation synchronization sensors as the rotation speed of one of said two motors drops.

4. A device for opening and closing a vehicle top by rotations of drive shafts rotatably provided with both right and left sides of the vehicle, comprising two individual motors which actuate said individual drive shafts through speed reduction mechanisms, switching relays which switch the direction of rotation of both of said motors respectively, switching relay actuation transistors which individually actuate both of said switching relays, top-open and top-close command switches which command the opening and closing of said vehicle top, a switching command determination means which ascertains whether said top-open and top-close command switches are operated, an actuation means which conducts the top opening and closing when the top-open and top-close command switches are operated, rotation synchronization sensors which are possessed by at least one of the aforesaid two motors and generate pulses synchronized to the rotation of said motor, a rotation synchronization correction means which synchronizes the rotation speed of both of said motors when the pulses are fed back via said rotation synchronization sensors as the rotation speed of one of said two motors drops, position sensors provided with said two drive shafts which detect the rotation of each drive shaft to certain specified positions, and a position correction means which conducts position corrections for both drive shafts when signals are generated from one of said two position sensors.

5. A device for opening and closing a vehicle top by rotation of drive shafts rotatably provided with both right and left sides of the vehicle, comprising two individual motors which actuate said individual drive shafts through speed reduction mechanisms, switching relays which switch the direction of rotation of both of said motors respectively, switching relay actuation transistors which individually actuate both of said switching relays, top-open and top-close command switches which command the opening and closing of said vehicle top, a switching command determination means which ascertains whether said top-open and top-close command switches are operated, an actuation means which conducts the top opening and closing when the top-open and top-close command switches are operated, rotation synchronization sensors which are possessed by at least one of the aforesaid two motors and generate pulses synchronized to the rotation of said motor, a rotation synchronization correction means which synchronizes the rotation speed of both of said motors when the pulses are fed back via said rotation synchronization sensors as the rotation speed of one of said motors drops, a motor locking feedback means which detects locking of said two motors by detecting the pulse width generated by said rotation synchronization sensors, and an actuation stopping means which halts the actuation of said actuation means when a signal is generated by said motor locking feedback means.

* * * * *